(12) United States Patent
Schemm

(10) Patent No.: US 7,140,661 B1
(45) Date of Patent: Nov. 28, 2006

(54) TORSION DEVICE

(75) Inventor: Jerry Schemm, Great Bend, KS (US)

(73) Assignee: Hopkins Manufacturing Corporation, Emporia, KS (US)

( * ) Notice: Subject to any disclaimer, the term of this patent is extended or adjusted under 35 U.S.C. 154(b) by 0 days.

(21) Appl. No.: 11/141,570

(22) Filed: May 31, 2005

Related U.S. Application Data

(63) Continuation of application No. 11/073,373, filed on Mar. 4, 2005, now abandoned.

(51) Int. Cl.
*B62D 33/03* (2006.01)
(52) U.S. Cl. ..................... 296/57.1; 267/273
(58) Field of Classification Search .................. 296/50, 296/57.1; 267/2, 273, 154; 49/386
See application file for complete search history.

(56) References Cited

U.S. PATENT DOCUMENTS

| | | | | |
|---|---|---|---|---|
| 3,336,070 A | * | 8/1967 | Jackson | 296/57.1 |
| 4,143,904 A | * | 3/1979 | Cooper et al. | 296/57.1 |
| 5,988,724 A | * | 11/1999 | Wolda | 296/57.1 |
| 6,637,796 B1 | * | 10/2003 | Westerdale et al. | 296/57.1 |
| 6,676,196 B1 | * | 1/2004 | Smith | 296/146.8 |
| 6,811,208 B1 | * | 11/2004 | Kettinger | 296/146.8 |
| 2005/0179279 A1 | * | 8/2005 | Zagoroff | 296/50 |

\* cited by examiner

*Primary Examiner*—Jason Morrow
(74) *Attorney, Agent, or Firm*—Hovey Williams LLP

(57) ABSTRACT

A torsion device for facilitating opening and closing a gate attached to a support. The device broadly includes a first section, a second section, and a coupling section. The second section includes an angled portion and a contact portion. The angled portion is operable to be substantially inserted into the gate such that the contact portion generally abuts an interior surface of the gate when the gate is substantially opened. The coupling section couples the first section and the second section such that opening of the gate causes a torsional force to be applied by the device to facilitate opening and closing of the gate. The abutting of the contact portion improves functionality and reduces damage to the gate caused by the torsional force.

4 Claims, 5 Drawing Sheets

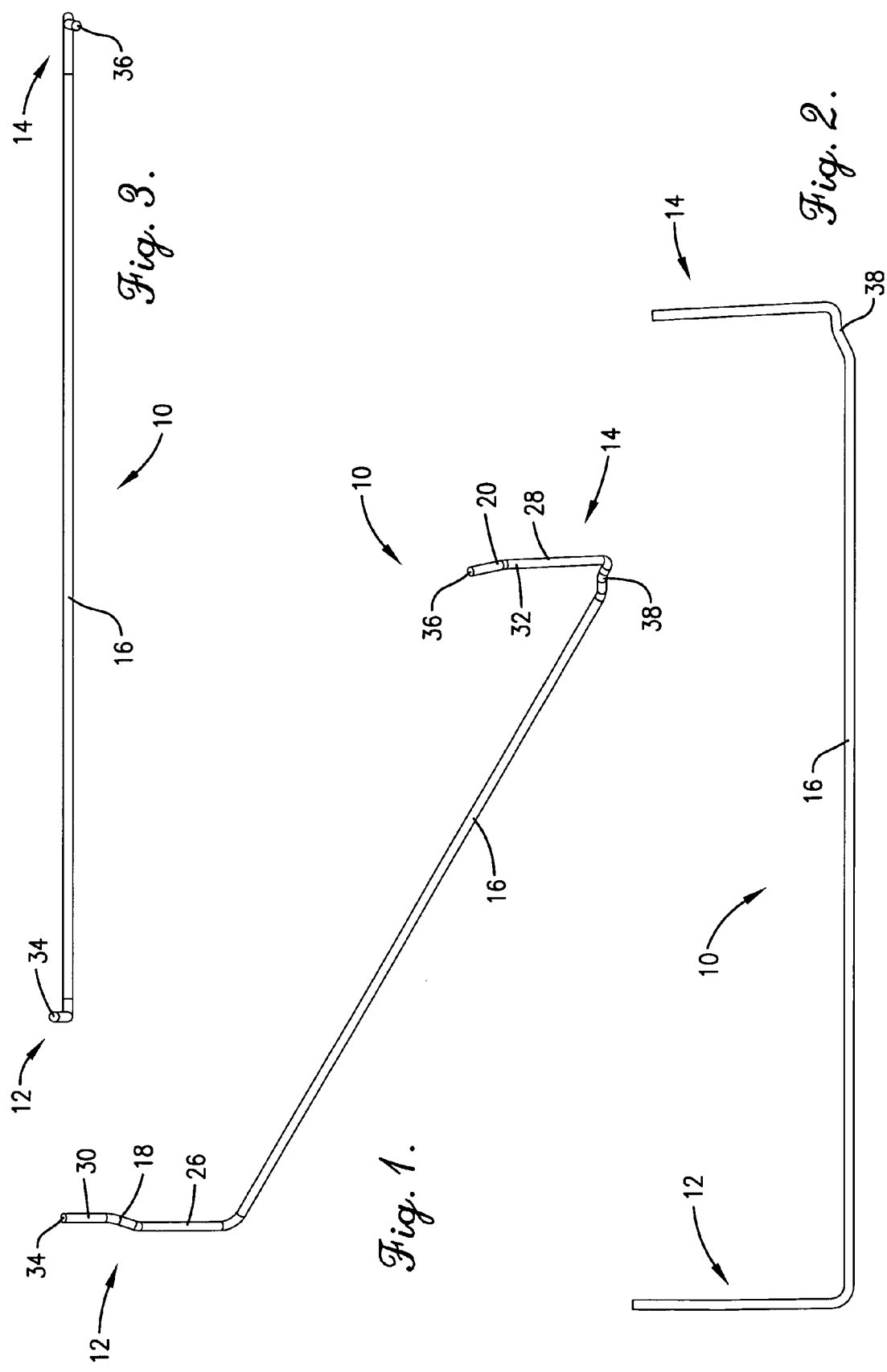

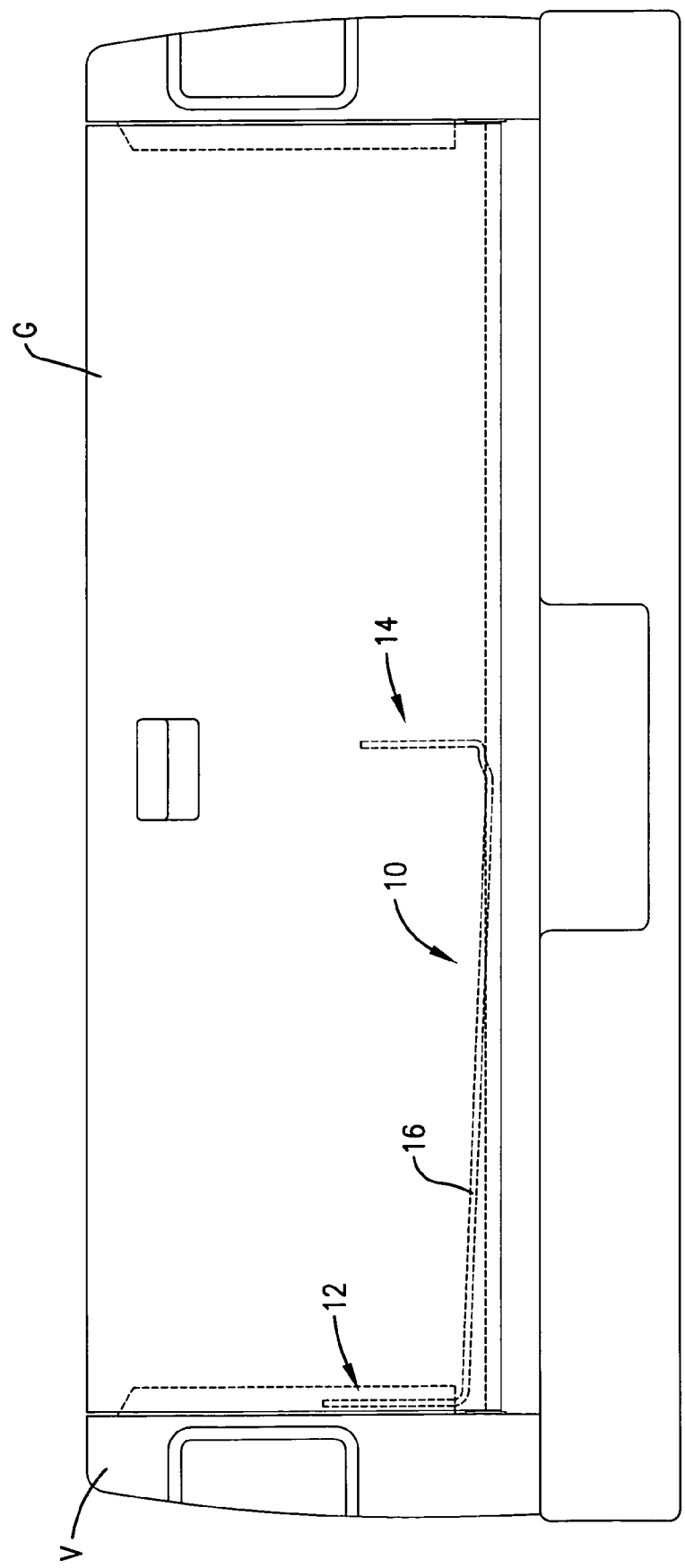

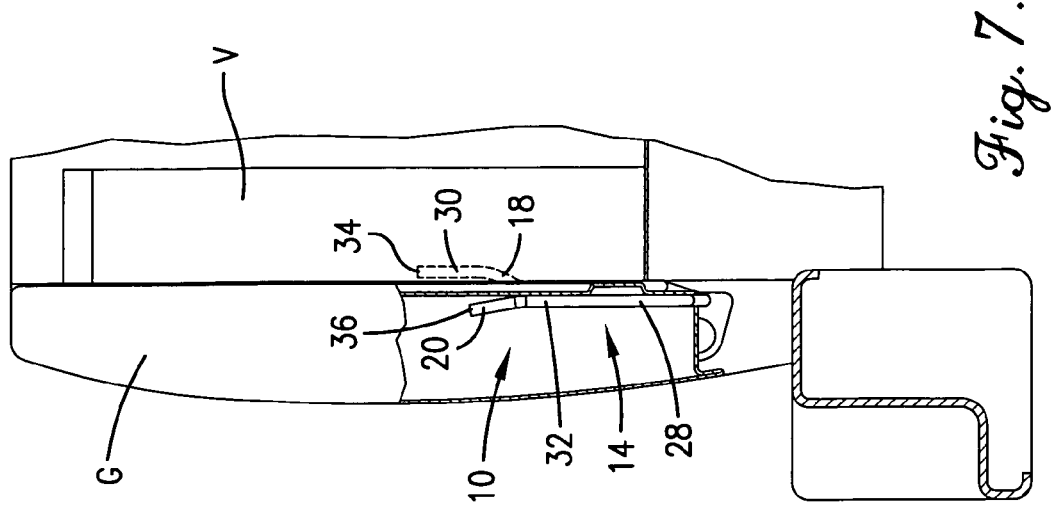
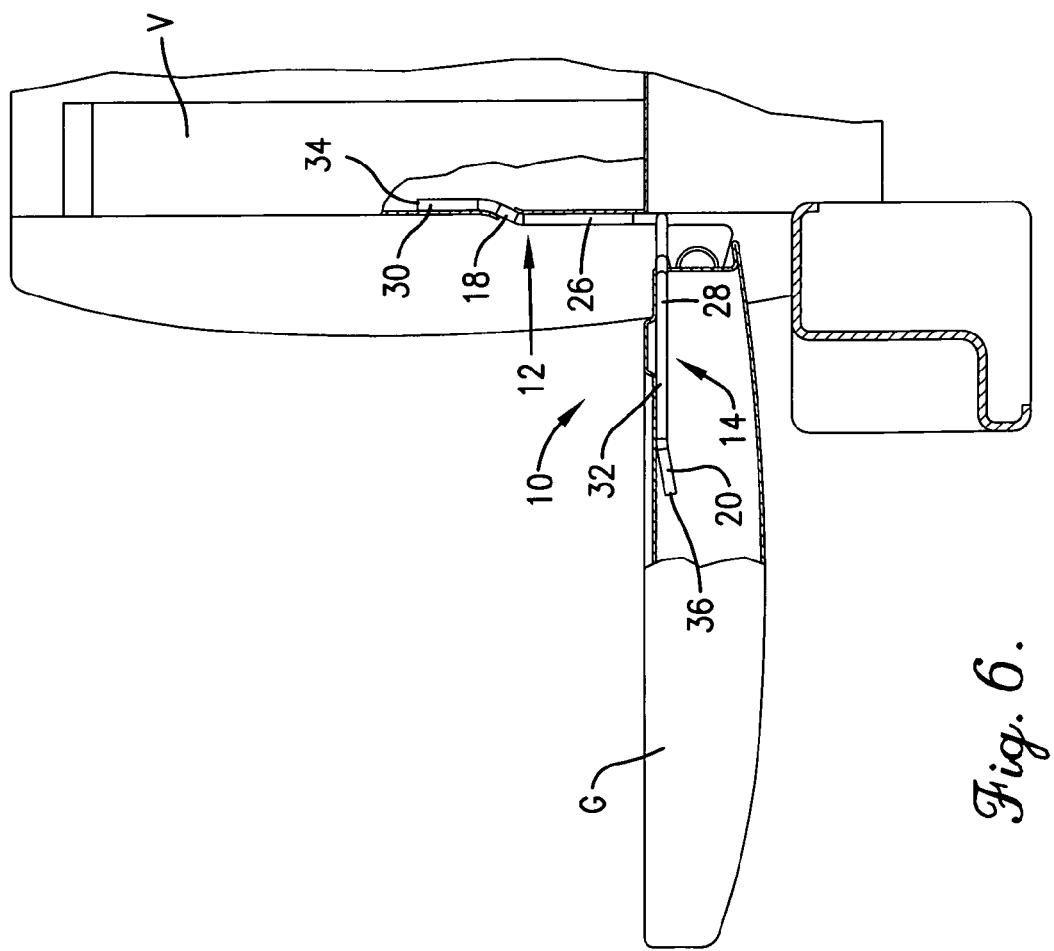

TORSION DEVICE

RELATED APPLICATION

The present application is a continuation and claims priority benefit, with regard to all common subject matter, of earlier-filed U.S. patent application titled "TORSION DEVICE", application Ser. No. 11/073,373, filed Mar. 4, 2005, abandoned Jul. 21, 2005. The identified earlier-filed patent application is hereby incorporated into the present application by specific reference

BACKGROUND OF THE INVENTION

1. Field of the Invention

The present invention relates to torsion devices. More particularly, the invention relates to a torsion device for facilitating opening and closing a gate attached to a support, such as a vehicle tailgate, by utilizing at least one angled portion.

2. Description of the Related Art

Torsion devices are often utilized in the art to facilitate opening and closing various gates. For example, various prior art torsion devices are utilized with a vehicle and a tailgate to reduce the amount of force needed to open and close the tailgate. Such conventional torsion devices are U-shaped and are utilized by inserting one end of the device into the vehicle and then inserting the other end of the device into the tailgate. Opening or closing of the tailgate causes one end of the torsion device to pivot while the other end remains stationary, thereby applying a torsional force to the device. The torsional force reduces the load of the tailgate and enables a user to open or close the tailgate with less force than otherwise required.

Despite such benefits, conventional torsion devices suffer from a number of disadvantages. For example, although utilizing angled sections for insertion into a vehicle is known, conventional torsion devices generally utilize an entirely straight section having a terminal end for insertion into a tailgate. Upon application of the torsional force, the entirely straight section, including the terminal end, often scratches, scrapes, or punctures the tailgate due to the large amount of force applied to a small area, such as the tip or edge of the terminal end. Similarly, the torsional force causes the inserted straight section to deform, thereby further limiting the area to which force may be applied and thus increasing the potential for damage to the tailgate.

Additionally, conventional torsion devices are inefficient as the amount of force the device may apply to reduce the load of the tailgate is limited by the small contact area between the device and the tailgate. For example, upon application of the torsional force, conventional devices fail to remain stationary, deform, and/or rotate such that force within the tailgate is applied to a small contact area, such as the terminal end. As the amount of force that may be applied to the small contact area is limited by the resiliency of the tailgate to puncture damage, the total amount of force that may be applied by the device is also limited thereby requiring a user to apply a greater force than otherwise necessary.

SUMMARY OF THE INVENTION

The present invention solves the above-described problems and provides a distinct advance in the art of torsion devices. More particularly, the invention provides a torsion device for facilitating opening and closing a gate attached to a support, such as a vehicle tailgate, that includes at least one angled portion to prevent damage and increase functionality of the device.

In one embodiment of the present invention, the torsion device includes a first section, a second section, and a coupling section. The second section has an angled portion and a contact portion. The angled portion is operable to be substantially inserted into the gate such that the contact portion generally abuts an interior surface of the gate when the gate is substantially opened. The coupling section couples the first section and the second section such that opening of the gate causes a torsional force to be applied by the device to facilitate opening and closing of the gate.

In another embodiment, the torsion device includes a first section, a second section, and a coupling section. The first section is operable to be at least partially inserted into the vehicle and includes a first longitudinal axis. The second section includes a straight portion having a second longitudinal axis which is generally parallel to the first longitudinal axis. The second section additionally includes a contact portion, an end, and an angled portion angled approximately between 15 degrees and 45 degrees from the second longitudinal axis. The angled portion is operable to be substantially inserted into the tailgate such that the contact portion generally abuts an interior surface of the tailgate when the tailgate is substantially opened, thereby reducing damage to the tailgate and facilitating operation of the device. The coupling section couples the first section and the second section such that opening of the gate causes a torsional force to be applied by the device to facilitate opening and closing of the tailgate.

In another embodiment, the torsion device includes a first section, a second section, and a coupling section. The first section includes a first contact portion and a first straight portion having a first longitudinal axis. At least a portion of the first section is operable for insertion in the vehicle. The first straight portion has a length of approximately between 5 centimeters and 20 centimeters. The first section additionally includes a first angled portion angled approximately between 15 degrees and 45 degrees from the first longitudinal axis. The first angled portion has a length of approximately between 0.5 centimeter and 5 centimeters.

The second section similarly includes a second contact portion and a second straight portion having a second longitudinal axis, the second longitudinal axis being substantially parallel to the first longitudinal axis. The second straight portion has a length of approximately between 5 centimeters and 20 centimeters. The second section also includes a second angled portion angled opposite the first angled portion. The second angled portion is angled approximately between 15 degrees and 45 degrees from the second longitudinal axis. The second angled portion is operable to be substantially inserted into the tailgate such that the second contact portion generally abuts an interior surface of the tailgate, to reduce damage to the tailgate and facilitate operation of the device, when the tailgate is substantially opened. The second angled portion has a length of approximately between 0.5 centimeter and 5 centimeters.

The coupling section couples the first section and the second section such that opening of the gate causes a torsional force to be applied by the device to facilitate opening and closing of the tailgate.

Other features of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein:

FIG. 1 is a front elevational view of a device constructed in accordance with the principals of a preferred embodiment of the present invention;

FIG. 2 is a front view of the device of FIG. 1;

FIG. 3 is a top view of the device of FIGS. 1 and 2;

FIG. 4 is a front schematic view illustrating the device of FIGS. 1–3 coupled with a vehicle and a tailgate;

FIG. 6 is a side schematic view illustrating the device of FIGS. 1–5 when the tailgate is open;

FIG. 7 is a side schematic view illustrating the device of FIGS. 1–6 when the tailgate is closed.

Figure 5:
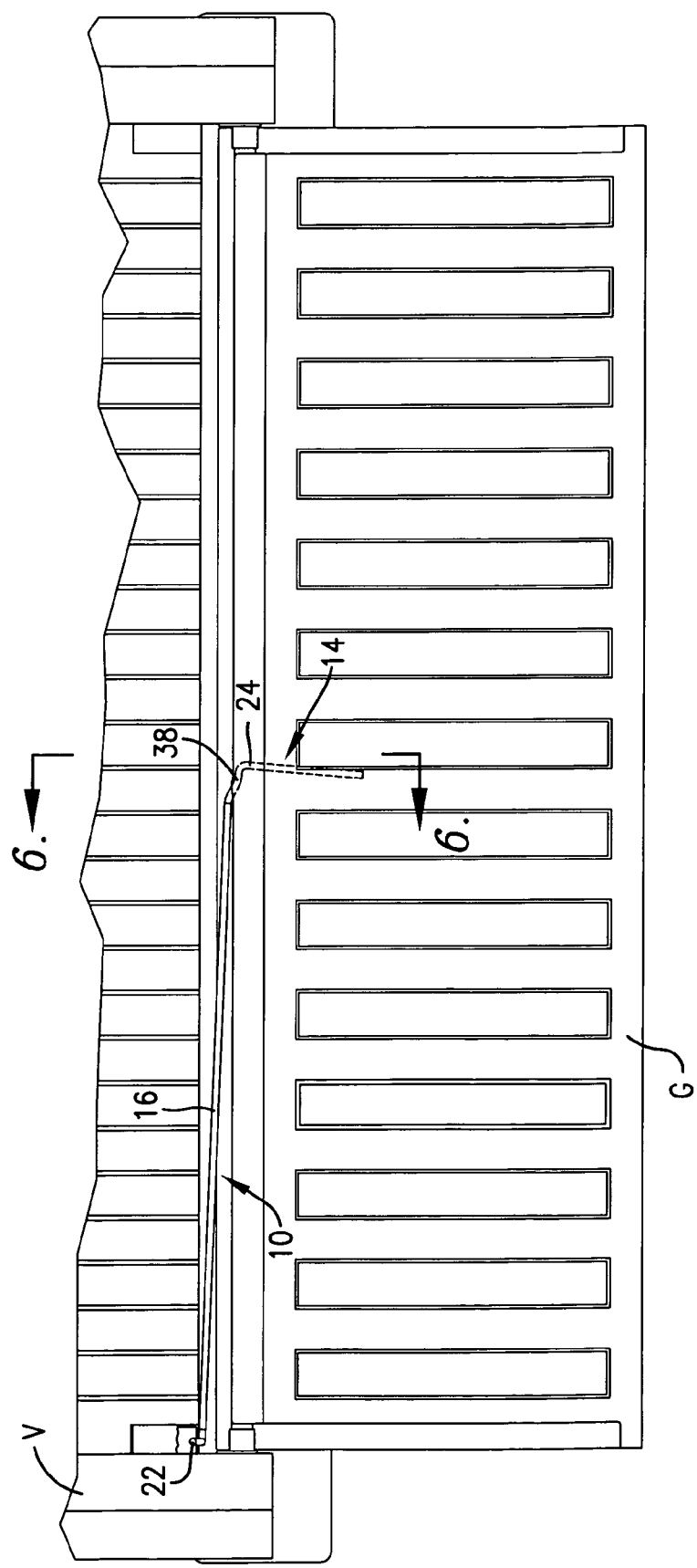
FIG. 5 is a top schematic view illustrating the device of FIGS. 1–4 when the tailgate is open.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

Turning now to the drawing figures, and particularly FIGS. 1–8, a torsion device 10 is shown constructed in accordance with a preferred embodiment of the present invention. The device 10 broadly includes a first section 12, a second section 14, and a coupling section 16 for joining the first section 12 and the second section 14. The first section 12 includes a first angled portion 18 and the second section 14 includes a second angled portion 20 to facilitate opening and closing of a gate, as is described below.

The device 10 may be utilized with any gate attached to a support, such as various sized doors, cabinets, hitches, covers, etc. However, the various embodiments as described herein utilize the device 10 with a support that is a vehicle V and a gate that is a tailgate G. The vehicle V may be any conventional vehicle having a hinged opening or gate such as the tailgate G. For example, trucks and various other vehicles commonly include a tailgate which may be lowered to access the storage area and bed of the truck. The tailgate G is conventionally coupled with the vehicle V, through hinges or latches, such that the tailgate G is operable to open or swing away from the vehicle V.

The vehicle V includes at least one vehicle hole 22 and tailgate G includes at least one tailgate hole 24 to facilitate use of the device 10. The holes 22,24 are preferably sized and configured to correspond to the diameter of the first section 12 and second section 14 such that at least a portion of the sections 12, 14, may pass through one of the holes 22, 24 as described below. Furthermore, the holes 22,24 are preferably positioned on the vehicle V and tailgate G to correspond to the size and length of the device 10 to enable the functionality described below.

Preferably, the lateral distance between the holes 22, 24 generally corresponds to the length of the coupling section 16. The vertical distance between the holes 22, 24 and the bed of the vehicle V generally corresponds to a portion of the length of the first section 12 and second section 14 such that at least a portion of the first section 12 and second section 14 may be inserted into the holes 22, 24 while the coupling section 16 is in close proximity to the bed of the vehicle V.

The coupling section 16 may couple the first section 12 and the second section 14 in any conventional manner. Preferably, the coupling section 16, first section 12, and second section 14 are integral within the same material to provide optimum strength and durability. For example, the device 10 may be formed by bending a steel bar, or other resilient material, into the forms and sections described here, such that the strength of the coupling between the sections 12, 14, 16 is maximized to prevent breakage of the device 10 due to the forces, including torsional force, incurred through usage.

However, the device 10 may be formed from non-integral components, such as by welding or otherwise securely coupling the first section 12 and second section 14 to the coupling section 16. Preferably, the device 10, including the sections 12, 14, 16, regardless of its manufacture, is comprised of steel or other resilient metal that is operable to withstand and generally store the torsional forces incurred through usage as described below.

The first section 12 includes a longitudinal axis and the second section 14 includes a longitudinal axis that is generally parallel to the first longitudinal axis. The coupling section 16 similarly includes a longitudinal axis that is generally perpendicular to the longitudinal axes of the first and second sections 12, 14. Thus, as the first section 12 and second section 14 are positioned at opposite ends of the coupling section 16, the device 10 forms a generally U-shaped configuration, as is shown in FIG. 1.

The first section 12 conventionally includes the first angled portion 18. The first angled portion 18 is operable to be substantially inserted into the vehicle hole 22. For example, the first angled portion 18 is angled to enable a portion of the first section 12 to be inserted into the vehicle hole 22 without substantially damaging the vehicle, as is generally known in the art. Similarly, it is preferable that other portions of the first section 12 be operable to be substantially or fully inserted into the vehicle hole 22, as described below.

The first section 12 preferably includes a first straight portion 26 positioned between the coupling section 16 and the first angled portion 18. The first straight portion 26 is preferably longer than the first angled portion 18 such that the first angled portion 18 may be substantially inserted into the vehicle hole 22 when the coupling section 16 is positioned in close proximity, or flush with, the vehicle V bed, such that the first straight portion 26 remains exterior to the vehicle V. The first straight portion 26 has a first longitudinal axis that is generally parallel with the longitudinal axis of the first section 12 and generally perpendicular to the longitudinal axis of the coupling section 16. The first section 12 additionally includes a terminal end 34.

The second section 14 includes the second angled portion 20 to facilitate operation of the device 10. The second angled portion 20 is operable to be substantially inserted into the tailgate hole 24. Preferably the second angled portion 20 is operable to be fully inserted into the tailgate hole 24. Similarly, it is preferable that other portions of the second section 14 be operable to be substantially or fully inserted into the tailgate hole 24.

The second section 14 preferably includes a second straight portion 28 positioned between the coupling section 16 and the second angled portion 20. The second straight portion 28 is preferably longer than the second angled portion 20 such that the second angled portion 20 may be substantially inserted into the tailgate hole 24 when the coupling section 16 is positioned in close proximity, or flush with, the vehicle V bed. Furthermore, at least a portion of the second straight portion 28 is preferably operable to be inserted into the tailgate hole 24 as described below. Those skilled in the art will appreciate that varying amounts of the second section 14, including the second angled portion 20 and second straight portion 28, may be operable for insertion in the tailgate G without affecting the functionality of the device 10 as described herein.

The second straight portion 28 has a second longitudinal axis that is generally parallel with both the longitudinal axis of the second section 14 and the first longitudinal axis of the first straight portion 26, and that is generally perpendicular to the longitudinal axis of the coupling section 16.

The first angled portion 18 and the second angled portion 20 are angled from the longitudinal axes of the first straight portion 26 and second straight portion 28. For example, the first angled portion 18 is preferably angled approximately between 15 degrees and 45 degrees from the first longitudinal axis of the first straight portion 26. More preferably, the first angled portion 18 is angled approximately between 25 degrees and 35 degrees from the first longitudinal axis of the first straight portion 26.

The second angled portion 20 is angled generally opposite to the first angled portion 18. Thus, if the first angled portion 18 angles generally towards a first direction, then the second angled portion 20 angles generally towards a second opposite direction. For example, the first angled portion 18, which is operable for insertion in the vehicle hole 22, preferably angles away from the tailgate G towards the forward portion of the vehicle V, while the second angled portion 20, which is operable for insertion in the tailgate hole 24, preferably angles away from the tailgate G and away from the vehicle V, such that the two angled portions 18, 20 are generally opposed.

The second angled portion 20 may be equally angled an opposite amount as the first angled portion 18. For example, if the first angled portion is angled 30 degrees from the first longitudinal axis, the second angled portion may be oppositely angled 30 degrees from the second longitudinal axis. However, the second angled portion 20 need not be exactly or precisely opposed to the first angled portion 18, as the device 10 may function as described herein when the angled portions 18, 20 are generally opposed, such as when the first angled portion 18 is angled approximately between 5 and 85 degrees from the first longitudinal axis of the first straight portion 26 and the second angled portion 20 is oppositely angled approximately between 5 and 85 degrees from the second longitudinal axis of the second straight portion 28. Preferably, the first angled portion 18 is angled approximately between 15 degrees and 45 degrees from the first longitudinal axis of the first straight portion 26 and the second angled portion is oppositely angled approximately between 15 degrees and 45 degrees from the second longitudinal axis of the second straight portion 28.

The first section 12 includes a first contact portion 30 and the second section includes a second contact portion 32. The contact portions 30, 32 are operable to contact the vehicle V and tailgate G respectively to apply a torsional force to reduce the applied force required to open and close the tailgate G. The torsional force is generated as a result of the second section 14 rotating with the tailgate G while the first section 12 remains generally stationary while the tailgate G is opened.

Preferably, the first contact portion 30 is positioned opposite the first straight portion 26 of the first section 12, such that the first angled portion 18 is positioned in between the first straight portion 26 and the first contact portion 30. The second contact portion 32 is preferably positioned between the second angled portion 20 and the second straight portion 28. Thus, the second contact portion 32 may be integral with the second straight portion 28 and represent a portion of the second straight portion 28.

As is described below in detail and shown in FIGS. 6–7, the second angled portion 20 and second contact portion 32 facilitate the functionality of the device 10 by ensuring that the contact portion 32 generally abuts the tailgate G to prevent damage and facilitate operation of the device 10. Specifically, the second angled portion 20 is operable to be substantially inserted into the tailgate G, through the tailgate hole 24, such that when the tailgate G is substantially opened, the torsional force applied by the device 10, as described above, enables the second contact portion 32 to generally abut and lie flat against an interior surface $G_s$ of the tailgate G. The abutting of the second contact portion 32 to the interior surface $G_s$ enables forces applied by the contact portion 32 to the tailgate G to be applied over an extended area, and not on a single or sharp point, such as a terminal end 36 of the second section 14.

Such functionality of enabling the contact portion 32 to generally abut the interior surface $G_s$ and preventing the terminal end 36 from contacting the interior surface $G_s$ is beneficial as it prevents the terminal end 36, or other small areas, from scratching or penetrating the interior surface $G_s$ and creating holes, scratches, and other damage to the tailgate G. As a result, the end 36 is prevented from substantially abutting the interior surface $G_s$ and causing damage. For example, the end 36 is prevented from contacting the surface $G_s$ at an acute angle or otherwise abutting the surface in a manner the causes damage. Thus, when the tailgate G is substantially opened, and a torsional force is applied by the device 10, the contact portion 32 generally abuts and lies flat against the interior surface $G_s$ thereby preventing a potentially large and damaging force from being applied to a small area.

The contact portions 30, 32 each provide a contact area for contact with an interior surface $V_s$ of the vehicle and the tailgate interior surface $G_s$. The contact portion 32 does not include the terminal end 36 and is increased through utilization of the angled portion 20 as the angled portion 20 enables a greater amount of the contact portion 32 to generally abut the interior surface $G_s$. Specifically, the angled portion 20 prevents the second section 14 from greatly deforming, due the applied torsional force, and also prevents small areas of the second section 14, such as the terminal end 36 from contacting the tailgate G. Thus, the angled portion 20 helps ensure that the contact portion 32 generally abuts the interior surface $G_s$ to provide an increased contact area for the application of the torsional force.

The increased contact area upon which the contact portion 32 applies force increases the amount of area to which the device 10 may apply forces and reduces damage to the tailgate G. Such increased area for the application of force improves the operation of the device as it enables greater forces to be applied to the vehicle tailgate G, without damaging the tailgate G.

The device 10 may additionally include other sections or features to facilitate operation such as a bend 38. The bend 38 enables the second section 14 to remain securely inserted in the tailgate G through the tailgate hole 24 without falling out or otherwise becoming dislodged. Specifically, the bend 38 is shaped such that when the coupling section 16 is in close proximity to the vehicle V bed the bend 38 may be generally inserted into the tailgate hole 24, as shown in FIG. 5.

Figure 8:
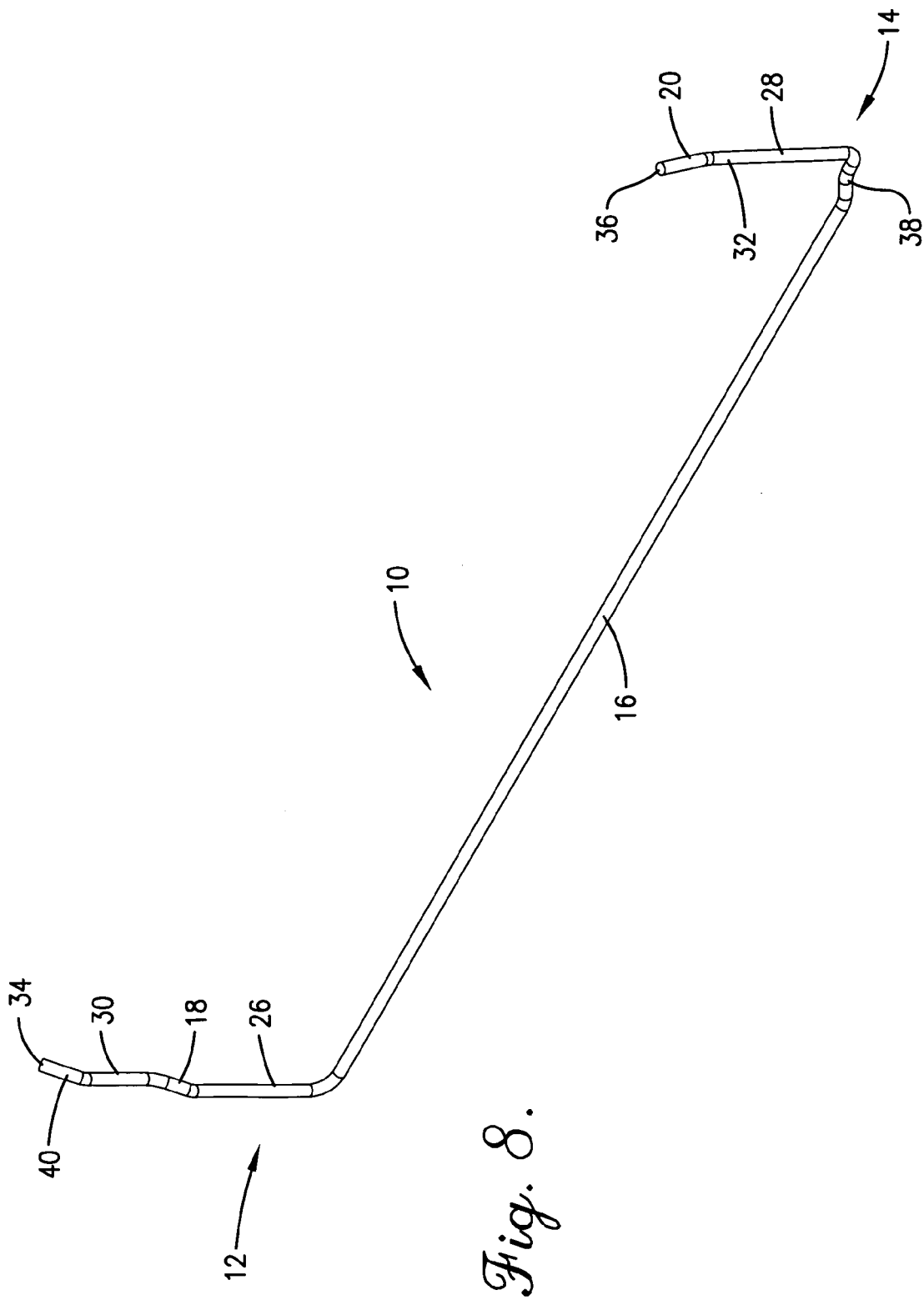
FIG. 8 is a front elevational view of the device of FIGS. 1–7 including an additional angled portion.

As shown in FIG. 8, in various embodiments, the first section 12 may include a third angled portion 40 positioned between the first contact portion 30 and the terminal end 34. The third angled portion 40 is substantially similar to the second angled portion 20, with the exception that the third angled portion 40 is generally angled in an opposite direction than the second angled portion 20. The third angled portion 40 functions in a substantially similar manner as the second angled portion 20 to generally prevent the terminal end 34 from abutting, contacting, and/or damaging the interior surface $V_s$. The third angled portion 40 additionally increases the contact area between the contact portion 30 and the interior surface $V_s$ to improve functionality of the device, in a substantially similar manner as described above in relation to the second angled portion 20.

Preferably, the device 10 is sized and configured to function with the vehicle V and tailgate G as described herein to facilitate operation of the device 10. As described above, the distances between the holes 22, 24 generally correspond to various dimensions of the device 10. Additionally, the device 10 is preferably sized to provide a sufficient amount of force to assist in opening and closing the tailgate G. For example, the straight portions 26, 28 preferably have a length of approximately between 5 centimeters and 30 centimeters, the contact portions 30,32 preferably a length of approximately between 3 centimeters and 10 centimeters, the angled portions 18, 20, 40 preferably a length of approximately between 0.5 centimeter and 5 centimeters, the coupling section 16 preferably has a length of approximately between 50 centimeters and 150 centimeters, and the diameter of the first section 12, second section 14, and coupling section 16 are preferably equal and approximately between 0.25 centimeter and 1.5 centimeters. However, those skilled in the art will appreciated that these values may vary when the device is utilized with other types of gates and supports.

In operation, at least a portion the first section 12 is inserted into the vehicle hole 22. As is known in the art, the first angled portion 18 is generally inserted into the vehicle hole 22 to enable a portion of the section 12, preferably including at least a portion of the contact portion 30, to be inserted into the vehicle hole 22 while the coupling section 16 remains in general proximity to the bed of the vehicle V. The coupling section 16 is positioned in proximity to the bed of the vehicle V, and a least a portion of the second angled portion 20 and at least a portion of the second contact portion 32 are inserted into the tailgate hole 24. For example, the bend 38 may be generally inserted into the tailgate hole 24 in a conventional manner to enable the insertion of at least a portion of the second section 14 within the tailgate G. Preferably, the first angled portion 18, first contact portion 30, and terminal end 34 are inserted through the vehicle hole 22 and at least a portion of the second straight portion 28, second angled portion 20, and terminal end 36 are inserted through the tailgate hole 24.

After installation of the device 10, a user may open the tailgate G in a conventional manner, such as by lifting a latch. As the tailgate G is opened, the weight of the tailgate causes a torsional force to be applied by the device 10 as the inserted portions of the second section 14 are pivoted downward due to movement of the tailgate G while the inserted portions of the first section 12 remain stationary. The torsional force reduces the effective weight of the tailgate G by causing the second contact portion 32 to abut the interior tailgate surface $G_s$ and apply a opposing force to the contact area that offsets the weight of the tailgate G. Similarly, the torsional force reduces the effective weight of the tailgate G by causing the first contact portion 30 to abut the interior vehicle surface $V_s$ and apply an opposing force to offset the weight of the tailgate G. Thus, the torsional force reduces the effective weight of the tailgate G such that tailgate G may be easily supported and opened by the user. Similarly, the torsional force reduces the amount of force the user must apply to lift and close the tailgate.

Throughout the application of the torsional force, the angled portion 20 assists in ensuring that the contact portion 32 remains generally flat and abutted against the interior surface $G_s$ to prevent the terminal end 36, or other compact or small areas, from contacting the interior surface $G_s$. As described above, such functionality reduces damage to the vehicle V and tailgate G and improves the functionality of the device 10 by enabling the user to open or close the tailgate with less force than otherwise necessary.

The functionality of the device 10 is also improved by the angled portion 20 as it increases the contact area between the contact portions 32 and the interior surface $G_s$ by ensuring that the contact portion 32 remains generally flat against the interior surfaces $G_s$ during operation. Thus, as described above, the increased contact area limits damage to the tailgate G, and also generally increases the amount of force applied to any particular area by the device 10, thereby resulting in increased functionality.

As such, the user may utilize the device 10 to facilitate opening and closing the tailgate G, without damaging the tailgate G, as the angled portion 20 prevents sharp, protruding, or otherwise small areas from contacting the interior surface $G_s$ and also enables the contact portion 32 to generally abut the interior surface $G_s$ to provide an increased contact area for the application of force.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A torsion device for facilitating opening and closing of a tailgate attached to a vehicle, the device including:
   a first section having—
      a first straight portion having a first longitudinal axis, the first straight portion having a length of approximately between 5 centimeters and 20 centimeters,
      a first contact portion having a length of approximately between 3 centimeters and 10 centimeters,
      a first terminal end, and
      a first angled portion angled approximately between 15 degrees and 45 degrees from the first longitudinal axis, the first angled portion having a length of approximately between 0.5 centimeter and 5 centimeters;
   a second section having—
      a second straight portion having a second longitudinal axis, the second longitudinal axis being substantially parallel to the first longitudinal axis, the second straight portion having a length of approximately between 5 centimeters and 20 centimeters, and
      a second contact portion having a length of approximately between 3 centimeters and 10 centimeters,
      a terminal second end, and a second angled portion angled opposite the first angled portion, the second angled portion angled approximately between 15 degrees and 45 degrees from the second longitudinal axis, the second angled portion being operable to be substantially inserted into the tailgate such that the second contact portion generally abuts an interior surface of the tailgate when the tailgate is substantially opened, thereby reducing damage to the tailgate and facilitating operation of the device, the second angled portion having a length of approximately between 0.5 centimeter and 5 centimeters; and a coupling section for coupling the first section and the second section such that opening of the gate causes a torsional force to be applied by the device to facilitate opening and closing of the tailgate, the coupling section being generally perpendicular to the first section and the second section, wherein the abutting of the second contact portion to the interior tailgate surface facilitates opening and the closing of the tailgate by providing a contact area between the second contact portion and the interior tailgate surface for the application of the torsional force.

2. The device of claim 1, wherein the first section includes a third angled portion angled generally opposite the second angled portion and positioned between the first contact portion and the first terminal end, the third angled portion being operable to generally prevent the first terminal end from abutting an interior surface of the vehicle when the tailgate is substantially opened.

3. The device of claim 2, wherein the terminal ends do not substantially abut the interior surfaces when the gate is substantially opened, thereby reducing damage to the vehicle and the tailgate.

4. The device of claim 1, where in the second contact portion is integral with the second straight portion.

* * * * *